United States Patent [19]

Kamper et al.

[11] Patent Number: 5,458,898
[45] Date of Patent: Oct. 17, 1995

[54] PROCESS OF MICROWAVING A FOODSTUFF

[75] Inventors: Susan L. Kamper, Waconia; Mary A. McGauley, Zimmerman, both of Minn.

[73] Assignee: General Mills, Inc., Minneapolis, Minn.

[21] Appl. No.: 237,703

[22] Filed: May 3, 1994

Related U.S. Application Data

[62] Division of Ser. No. 903,112, Jun. 23, 1992, Pat. No. 5,362,504.

[51] Int. Cl.⁶ .............................. A23D 9/00; A23L 1/035; A23L 1/0522; A23L 1/18
[52] U.S. Cl. .................... 426/243; 426/289; 426/302; 426/601; 426/618
[58] Field of Search .................................. 426/243, 289, 426/302, 601, 618

[56] References Cited

U.S. PATENT DOCUMENTS

| | | | |
|---|---|---|---|
| 3,704,133 | 11/1972 | Kracauer | 426/93 |
| 4,283,427 | 8/1981 | Winters et al. | 426/107 |
| 4,751,090 | 6/1988 | Belleson et al. | 426/93 |
| 4,795,649 | 1/1989 | Kearns et al. | 426/243 |
| 4,806,718 | 2/1989 | Seaborne et al. | 219/730 |
| 4,880,646 | 11/1989 | Lew et al. | 426/93 |
| 4,882,184 | 11/1989 | Buckholz et al. | 426/243 |
| 4,904,490 | 2/1990 | Buckholz, Jr. et al. | 426/243 |
| 4,971,817 | 11/1990 | Bauman et al. | 426/107 |
| 4,985,261 | 1/1991 | Kang et al. | 426/243 |
| 5,043,173 | 8/1991 | Steinke et al. | 426/94 |
| 5,053,236 | 10/1991 | Parliment et al. | 426/234 |
| 5,069,916 | 12/1991 | Buckholz et al. | 426/234 |
| 5,077,066 | 12/1991 | Mattson et al. | 426/234 |
| 5,089,278 | 2/1992 | Haynes et al. | 426/98 |
| 5,091,200 | 2/1992 | Kang et al. | 426/243 |
| 5,093,138 | 3/1992 | Drew et al. | 428/68 |
| 5,118,514 | 6/1992 | Adams et al. | 426/94 |

FOREIGN PATENT DOCUMENTS 242828  10/1987  European Pat. Off. .

OTHER PUBLICATIONS

Meinhold, N. M. "Lecithin Development and Applications", *Food Processing*, May 1991, pp. 130–134.

*Primary Examiner*—Leo B. Tentoni
*Attorney, Agent, or Firm*—John A. O'Toole; L. MeRoy Lillehaugen

[57] ABSTRACT

An edible microwave composition is prepared for coating a food product to produce rapid, high temperature surface heating and/or browning on exposure to microwave energy. A method of heating/browning a food product includes the steps of coating a food product with a microwavable composition and subjecting the coated product to microwave energy. The microwavable composition essentially includes 1) about 8% to 97% of an edible oil; 2) about 1% to 90% of a selected microwave absorbing emulsifier; 3) about 0.1% to 30% of a supplemental microwave absorbing inorganic material; 4) about 2% to 90% of a microwave absorbing polyhydric alcohol; and in preferred compositions, 5) about 2% to 25% by weight of a thickener.

10 Claims, 1 Drawing Sheet

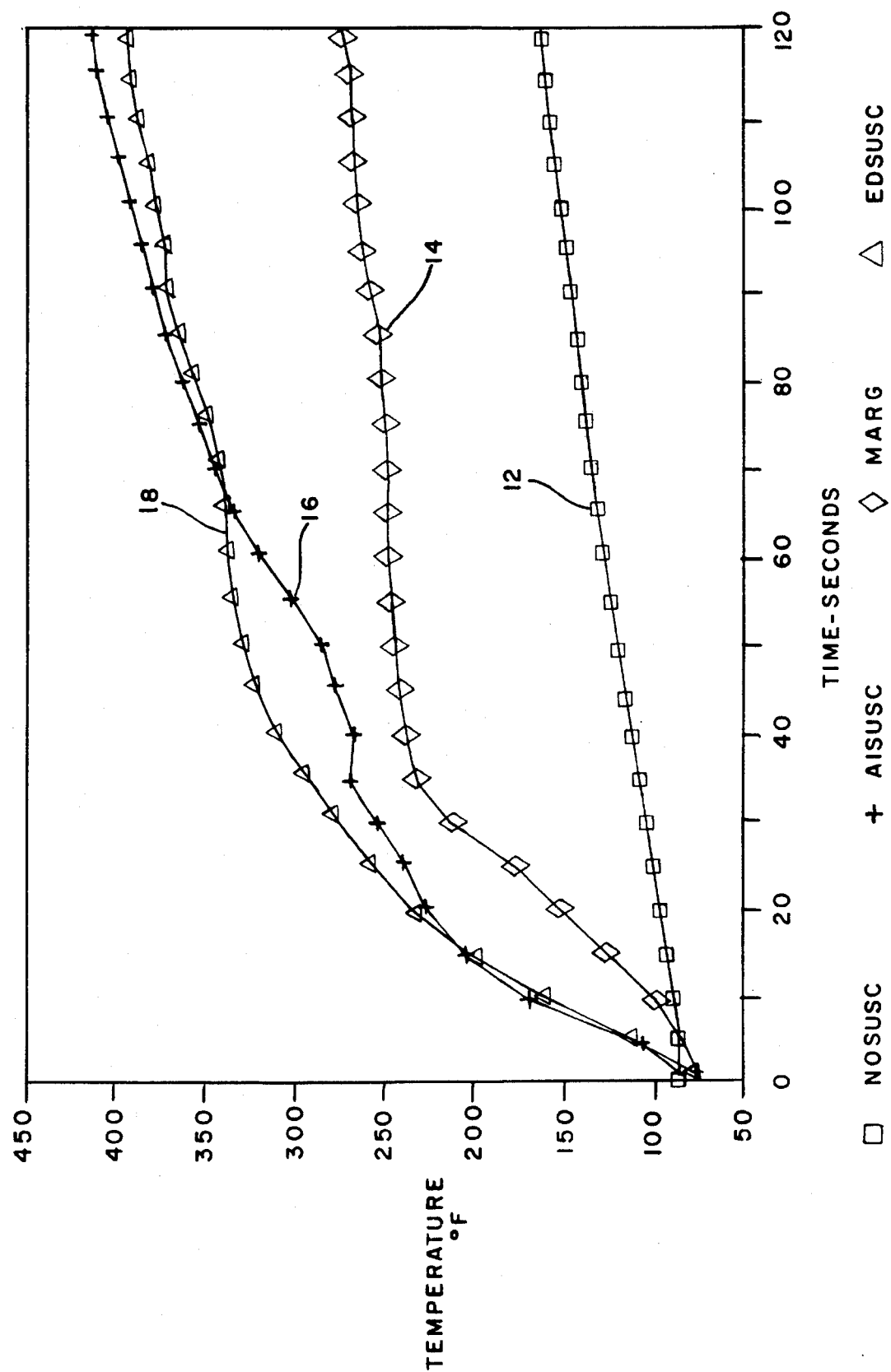

PROCESS OF MICROWAVING A FOODSTUFF

This is a division of application Ser. No. 07/903,112, filed Jun. 23, 1992, now U.S. Pat. No. 5,362,504 (issued Nov. 8, 1994).

FIELD OF THE INVENTION

The present invention relates to food products and to their methods of preparation. In particular, the present invention relates to edible microwave susceptor compositions for topical application to a food substrate.

BACKGROUND OF THE INVENTION

In recent years, the popularity of microwave ovens in the household has increased dramatically. This popularity is due, in part, to the ease and speed of microwave cooking of many foods, compared to conventional cooking. As the number of households having microwave ovens increases, the demand for prepared foods adapted for microwave use also increases. However, microwave cooking of some types of foods has experienced some consumer resistance and dissatisfaction. The characteristics and nature of microwave cooking are substantially different from conventional convection heating, and therefore some foods do not cook well in the microwave oven.

One of the more notable disadvantages of microwave cooking is the inability to produce the highly desirable crispness and/or brown color on the surface of the food. The crisping and brown color are particularly desirable on food substrates such as battered and/or breaded food pieces (e.g., fish and chicken portions), breads, batter based baked goods, and pastries. Microwave cooking even for extended times does not raise the surface temperature of the food to a high enough temperature, for a period of time long enough, to brown or to crispen the food.

The primary reason for such failure is that both crispening and browning generally require a temperature of 300° F.$\geq$. Such temperatures, of course, are well above the boiling temperature of water and even the elevated boiling temperatures of concentrated aqueous solutions. As food products are microwave heated without assistance of a microwave susceptor, greater amounts of moisture are driven off keeping the food product relatively cool (i.e., less than browning temperatures) until substantially all moisture is lost. Excessive moisture loss, of course, will render the food product unsuitable for consumption. Moreover, moisture driven from the food product interior by microwave heating tends to soften not crispen the food products exterior surface.

One approach to overcome the problem of the absence of browning and/or crispening during microwave heating has been to develop specialized food packaging for microwave food products. The art directed towards consumer microwave food packaging has experienced tremendous development in the last several years.

While many factors have contributed to the rapid advancement in this art (e.g., increasing preparation of microwave ovens into households, less time available for meal preparation, etc.), perhaps the most significant has been the development of the metallized film microwave susceptor. The metallized susceptor upon exposure to microwave energy can reach temperatures between 400° to 800° F. Such temperatures are high enough to cause browning. When such microwave susceptors are in direct contact with the surface of a food product, upon microwave heating the susceptor quickly heats the food surface. Both the susceptor final temperature and the heating rate are important to obtaining the desired end food product attributes. If either the susceptor temperature or the rate at which the susceptor heats is too low, then moisture from the interior of the food product being heated will continually resupply the moisture being driven off at the food product's surface. As a result, the surface fails to crispen or to reach browning temperatures.

In certain other popular applications such as microwave popcorn products, the microwave susceptor's rapid heating feature is more important than final temperature. The rapid heating allows the fat/popcorn charge to heat more rapidly leading to improved product performance.

The metallized film susceptor in simplest form comprises a plastic film substrate and a thin deposit of a layer of aluminum thereupon. The prior art includes numerous improvements directed towards modifying and improving one or more performance attributes of the metallized films. The prior art includes a wide and rapidly growing variety of packaging structures which employ metallized film microwave susceptors as an integral element of the package.

With the development of this technology, microwave packaging has enjoyed a tremendous increase in popularity and usage in view of the performance, convenience, disposability and low cost of metallized film microwave susceptors. Recently, however, concern has been raised regarding the potential for migration of materials from the metallized film to the foodstuff to be heated. In view of these potential concerns, there is a present and growing need for improved microwave susceptors of enhanced safety but which nonetheless provide the performance, convenience, ease of disposal and cost advantages equivalent to metallized film microwave susceptors.

Another microwave susceptor technology involves chemical compositions which heat upon exposure to microwave energy. Compared to metallized film susceptors, the chemical susceptor art is relatively undeveloped. Most chemical susceptors are fabricated from formulations which are inedible. An early and brief description of an inorganic alumina gel which absorbs microwave energy is given in (Controlled Microwave Heating and Melting of Gels), by Roy et al. (J. Am. Ceram. Soc. 68(7) 392–95, 1985). An improved chemical microwave susceptor composition based upon ceramic oxide gels is described by Seaborne in U.S. Pat. No. 4,806,718, issued Feb. 21, 1989, and is entitled Ceramic Gels with Salt for Microwave Heating Susceptor. The improved chemical microwave susceptor compositions described in the '718 patent include a wider class of ceramic gel-forming materials which themselves are microwave active, and the addition of sodium chloride to improve microwave heating performance. While useful and an advance in the art, these compositions, while not toxic, are not edible per se. Moreover, the compositions upon drying to useful moisture are highly frangible or even particulate in nature. As a result, these microwave active materials must be supported by or formed into useful shapes by an appropriate binder or carrier, e.g., a plastic or a cementitious material.

However, certain chemical microwave susceptors, while not intended to be consumed per se, can be formulated to comprise edible materials. For example, another description of a liquid chemical microwave susceptor composition is given in U.S. Pat. No. 4,283,427 (entitled Microwave Heating Package, Method and Susceptor Composition, issued Aug. 11, 1981 to Winters et al.). The '427 patent teaches that "The chemical susceptor is comprised of a solute, such as inorganic salts of Group IA and IIA, and a polar solvent for the solute such as water." The salts are taught as being useful to reduce the vapor pressure of the polar solvent. The chemical susceptor can also include a "heating profile moderator." A wide variety of materials are taught as being useful to affect one or more heating attributes of the susceptor. The temperature profile materials included are broadly defined and include animal, vegetable and mineral materials. Inasmuch as the chemical microwave susceptor composition is liquid in physical state, the susceptor therein described additionally essentially comprises a holder for the liquid. Moreover, while the chemical susceptor composition is fabricated from materials of low toxicity, the chemical susceptor composition is clearly not intended to be in direct contact with a food item to be heated or to be edible per se.

In a related manner, the prior art further includes a large number of compositions formulated with edible ingredients intended for use as microwave browning compositions. These formulations are chemical susceptors of an edible variety which, however, can obtain temperatures of only about <250° F. In this approach, various sauces and other coatings which absorb or concentrate the microwaves are applied to a food substrate to accomplish heating and/or browning. Exemplary of this is U.S. Pat. No. 5,077,066 (issued Dec. 31, 1991). The general mechanism is to provide browning not by reaching browning temperatures but by including materials that react at lower temperatures to provide the browning effect via the Maillard reaction. Generally, these formulations essentially include the combination of a reducing sugar or reducing agent and a protein or other nitrogen containing material which upon heating react in browning reactions. Alternatively, the compositions comprise colored compositions disguised by microencapsulation. Upon heating, the encapsulant melts to expose the color. These compositions contain edible materials that absorb microwave energy and thus heat. However, such formulations are not intended to generate the high heat or high temperatures (300° F.≧) of the present invention. Moreover, these coatings have met with only limited commercial success.

The previous efforts to overcome the inability of foods to crispen and brown during microwave cooking or heating are not completely effective in achieving a pleasing crisp texture and a brown color in the microwave oven. In addition, these compositions are not particularly stable for extended periods of time, and this instability typically results in premature browning during storage. There is, therefore, a need for an edible microwave susceptor composition that is shelf-stable and can be activated by microwave energy to produce the distinctive brown color associated with conventional cooking.

Accordingly, it is an object of the present invention to provide an edible microwave susceptor composition.

Another object of the present invention is to provide an edible microwave susceptor that is free of sugar and protein reactants and thus is stable at room temperature for extended periods of time and thus avoids the problems of certain of the prior art compositions.

Another object of the present invention is to provide an edible microwave susceptor that can be applied to the surface of a prepared food substrate that upon microwave heating will heat quickly to over 300° F. thereby rapidly heating the food substrate to crispen and/or brown the surface thereof.

Still another object of the present invention is to provide an edible microwave susceptor composition that achieves heating to temperatures above 300° F.

A further object of the present invention is to provide microwave susceptor compositions that do not require a holding container.

A still further object of the present invention is to provide edible microwave susceptor compositions that can be added to other food compositions for increasing the microwave absorption and heating performance of such fortified food products.

Surprisingly, the above objectives can be realized and superior edible microwave susceptor products provided that quickly heat upon exposure to microwave energy to temperatures exceeding 300° F. The present compositions provide crispening and/or browning benefits to the food products to which they are applied or in which they are incorporated. The compositions are exceptionally stable upon extended storage and require only simple admixture to prepare.

BRIEF DESCRIPTION OF THE DRAWINGS

FIG. 1 is a time vs. temperature graph depicting temperature profile curves of compositions of the present invention as well as for other representative compositions and susceptors as further described in Example 1.

SUMMARY OF THE INVENTION

In its primary product aspect, the present invention is directed to an edible, sugar-and amine-free chemical microwave susceptor compositions that can rapidly heat to temperatures >300° F. The present microwavable compositions essentially include: 1) about 8% to 97% of an edible oil; 2) about 1% to 90% of a selected emulsifier; 3) about 0.1% to 30% of a supplemental selected microwave absorbing inorganic material; and 4) 2% to 90% of a polyhydric alcohol microwave absorbing member. The present compositions are essentially characterized by being able to obtain a temperature of about 300° F. in about 0.5 to 4 minutes upon heating with microwave energy. In certain embodiments, the compositions can further comprise 5) about 2% to 25% by weight of a bodying or thickening agent. The present microwave susceptor compositions are essentially free of added or unbound water (<1%), and the combination of a reducing sugar and amine. Preferred compositions are also sugar free (<1%) and amino acid free (<1%). The selected polyhydric alcohol member is selected from the group consisting of glycerine, propylene glycol and mixtures thereof.

In another product aspect, the present invention provides a food substrate having a surface portion coated with the present edible susceptor composition. Useful food substrates are those having a surface portion that is beneficially browned and/or crispened upon microwave heating or a food that requires rapid heating, e.g., microwave popcorn, microwave ice cream sundae.

In its method aspect, the present invention provides methods for rapidly heating and browning prepared food substrates employing the present edible susceptor compositions. The present methods include the essential steps of A) providing a prepared food substrate having at least one surface capable of crispening and/or browning; B) providing a microwave susceptor composition; C) coating the composition of (B) onto the surface of the foodstuff to form a coated foodstuff; and D) exposing the coated foodstuff to microwave radiation for a period of time between 0.5 to 4 minutes to achieve a coating composition temperature of >300° F. to form a browned and/or crispened food product.

DETAILED DESCRIPTION OF THE INVENTION

The present invention is directed to an edible microwave susceptor composition that can be evenly applied to the outer surface of a food product to produce browning and/or crispening by heating to >300° F. when cooked or heated in a household microwave oven. The present invention also provides food compositions that are fortified with the present susceptor compositions for more rapid heating and/ or for heating to browning temperatures. In its method aspect, the present invention provides methods for microwave browning that importantly involve applying or incorporating the present susceptor compositions. Each of these compositions' components, method steps and use are described in detail below.

Throughout the specification and claims, percentages are by weight and temperatures in degrees Fahrenheit, unless otherwise indicated.

Edible Oil

A first essential ingredient of the present invention is an edible fatty triglyceride. Of course, the present edible fatty triglyceride material itself is relatively inert to microwave heating and itself absorbs little microwave energy. However, the edible fatty triglyceride serves more than as a mere carrier for the microwave absorbing components but also as a heat sink or heat transfer fluid for the heat energy generated by the essential microwave absorbing components described below. The edible triglyceride can reach temperatures well in excess of 212° F. or the boiling temperature of water. The edible triglyceride effectively transfers the generated heat to the surface of the food substrate even when the surface of the food substrate is highly irregular, e.g., a breaded frozen food item.

The fat which may be used in the present invention may be any food grade fat or shortening suitable for cooking applications. The fats which may be used generally include vegetable fats, lard, tallow and mixtures thereof. The fat may be fractionated, partially hydrogenated, and/or interesterified. Edible reduced or low-calorie, or non-digestible fats, fat substitutes, or synthetic fats, such as sucrose polyesters which are process compatible, may also be used. The shortenings or fats may be liquid or solid or semi-solid at room temperature of about 75° F. to about 90° F. Preferred for use herein are vegetable oils such as soybean, olive, cottonseed, corn, canola, sunflower, safflower, peanut oil and mixtures thereof.

Highly preferred for use herein are fats that are liquid or semi-solid, i.e., oils or primarily liquid oils compared to triglycerides that are normally solid at room temperature. Liquid oils with some hardstock therein are sometimes referred to in the art and herein as "fluid fats." Fluid fats and preferably liquid oils are preferred since such materials do not require or require less energy associated with the phase transition from a solid to a liquid. As a result, such fluid fats are able to heat more quickly thereby reaching the present desired operating temperatures faster so as, in turn to transfer the thermal heat more quickly to the food substrate. However, in certain embodiments fluid fats provide not only generally comparable heating rates to pure liquid fats but also provide the advantage of providing a better suspension of the essential inorganic ingredient described below as well as being thicker, less runny and easier to handle. In the present invention, such fluid fats can have about 1% to 15% hardstock (i.e., a component that is solid at 70° F.). More preferred materials comprise about 3% to 8% hardstock.

The present compositions essentially comprise about 8% to about 97% of the fatty triglyceride component. Preferred for use herein are compositions that comprise about 30% to 70% of the triglyceride since such compositions have a better balance between heating performance and flavor attributes. For best results the present compositions can comprise about 40% to 60%.

Emulsifier

The present edible microwave susceptor compositions further essentially comprise about 1% to 90% of selected microwave absorbing emulsifiers. Good results are obtained when the present compositions comprise about 10% to about 30% of the emulsifier. For better results, the compositions can comprise the emulsifier(s) within the above ranges and are further characterized in a ratio of about 0.9 to 2.5:1 emulsifier to polyhydric alcohol, preferably about 1.1 to 2:1.

While any number of emulsifiers can be used to emulsify the below described polyhydric alcohol with the essential triglyceride component, it has been surprisingly discovered to be particularly useful to select certain emulsifiers that not only emulsify the glycerine/triglyceride combination but which are additionally themselves unexpectedly microwave active. Such selection has been found important to obtaining the high temperatures obtained herein. Such selection has been found to be even more important to obtaining the rapid rate of microwave heating herein.

The selected emulsifiers useful herein are selected from the group consisting of lecithin, polyglycerol esters of fatty acids ("PGE's"), sorbitan monoesters, acetylated monoglycerides, sodium stearoyl-2-actylate, and mixtures thereof. Preferred emulsifiers are selected from the group consisting of lecithin, PGE's, and mixtures thereof. The preferred emulsifier for use herein is polyglycerol esters.

Inorganic Microwave Absorbing Member

The present susceptor compositions further essentially comprise about 0.1% to 30% of an edible selected microwave absorbing inorganic member. The selected inorganic member functions as a supplemental microwave absorbing component that is important to obtaining both the desirable high final operating temperatures as well as the high rate of temperature increase of the present susceptor compositions.

Better results in terms of maintaining a suspension of the inorganic member in the present compositions with desirable heating performance is obtained when the compositions comprise about 1% to 30% inorganic microwave absorbing member. For best results, the compositions desirably contain about 5% to 15% of the inorganic member. Of course, within the described concentration ranges, particular inorganic member concentration values will depend in large part upon such factors as the particular material selected and the heating properties desired.

Useful supplemental edible inorganic microwave absorbing agents are selected from the group consisting of sodium potassium tartrate, trisodium phosphate, aluminum potassium sulfate, sodium hexametaphosphate, sodium aluminium phosphate, titanium dioxide, silicon dioxide, magnesium oxide, elemental iron, and mixtures thereof. Preferred inorganic materials are salt hydrates (due to their being generally recognized as being safe for addition to various foods) selected from the group consisting of trisodium phosphate, sodium potassium tartrate and mixtures thereof.

Organic Microwave Absorbing Material

In certain highly preferred embodiments herein, the present edible microwave susceptor compositions further include a high boiling temperature edible organic microwave absorbing material as an organic microwave absorbing component. Useful herein as this additional organic microwave absorbing material is a polyhydric alcohol member selected from the group consisting of glycerine, propylene glycol, polyethylene glycol (molecular weight: 400–8000) and mixtures thereof. Since at higher usage levels propylene glycol has an off-taste perceptible by some, glycerine is the primary microwave material of choice. Throughout this description, the skilled artisan will appreciate that when the term "glycerine" is used, propylene glycol and glycerine/propylene glycol mixtures can be used but are less preferred.

Those embodiments of the present compositions that comprise the polyol generally contain about 2% to 90% by weight of this organic microwave active material. For better results in terms of microwave heating performance, the present compositions essentially comprise about 10% to 30% of the organic microwave active component. When used at excessively high levels, undesirable smoking, off-flavor or product softening can occur. When used at insufficient levels, however, the heating performance of the composition can be deficient.

As noted above, an added advantage of employing the selected emulsifier component(s) described above is to emulsify the present selected polyol component with the triglyceride component. Without the emulsifier, glycerine and/or propylene glycol are immiscible with the fat component.

Optional Ingredients

If desired, the present edible susceptor composition can further comprise a thickener ingredient(s) or, equivalently, a bodying agent(s). Useful thickeners herein are those that make the present susceptor compositions more viscous or otherwise reduce the tendency to flow or which hold the composition together. Particularly useful herein are oil thickeners such as fumed silicon dioxide which when added to the liquid oil component tends to thicken or even gel the oil. Another useful thickener is a powdered cellulose which even at low ingredient levels absorbs the other susceptor composition ingredients to form a loosely bound, non-free flowing, particulate composition. Other useful thickeners are dextrinaceous materials such as starch(es) and maltodextrin(s). Also useful as thickeners are the hard stock materials described above for thickening a liquid oil to form fluid fats.

If present, the thickener component can comprise about 2% to about 25%, preferably about 5% to 10% of the present compositions. Within the above range(s), particular use levels will vary depending upon the particular thickener material selected and desired susceptor composition end-use application.

It is also preferred that the present microwave compositions be essentially free of added or unbound water (i.e., <1%, preferably <0.5%). Being free of added water has been found to be important to both obtaining the desired high temperatures upon microwave heating as well as the rapid rate at which such temperatures are obtained. The term "free of added water" as used herein, however, does not refer to the moisture content associated with any water of hydration of the selected microwave absorbing salt components described above or water of hydration of an encapsulant gum.

Further, in certain embodiments it is desirable that the present susceptor compositions be essentially free of the combination (<1%, preferably <0.5%) of added reducing sugars and amine compounds (e.g., proteins). Such component combinations are undesirable for several reasons. First, such ingredients can interact upon extended storage to produce undesirable color, flavor and color reaction products. However, even when specially formulated or even encapsulated for extended shelf stability, such components are undesirable since when the present compositions are heated to their high operating temperatures undesirable reaction products can be generated. Such amine/sugar components are typically intended to react at those lower temperatures obtained by moisture containing browning compositions. The present compositions, however, can comprise modest quantities of either these sugars or protein materials by themselves. For example, the present susceptor compositions might be dispersed in a sugar/fat compound coating or emulsion, e.g., fudge that is added to a microwave ice cream sundae.

Of course, the present edible components are essentially free of any inedible components such as those intended for use in chemical susceptor compositions intended to be contained in a susceptor pouch or other suitable container.

Usage

The present edible susceptor compositions can be used in a wide variety of end-use applications. For example, the present edible susceptor compositions can be combined with or incorporated into other food systems to increase their microwave absorption characteristics. For example, the compositions can also be used as additives to microwave popcorn charges thereby eliminating the need for conventional, aluminumized film microwave susceptor or improving the microwave absorption characteristics of the fat/salt/popcorn charge.

In their browning and crispening application method of use aspect, the compositions are particularly suitable for partially cooked flour-based (whether dough or batter based) products that are to be reheated in a microwave oven by the consumer to finish cooking the product and brown the surface. Examples of this type of product include cookies, crackers, cakes, pie crusts, biscuits, muffins, rolls, pastries, pizza dough, breads, brownies, and snack foods. The browning composition is also suitable for browning meat, poultry, and other foods that do not typically brown during microwave cooking or heating and to a method of browning foods in a microwave oven. The present products are especially useful for battered and/or breaded prepared foods, e.g., battered and breaded fish, meat or vegetable portions. The present compositions are useful in connection with all manner of potato based products (e.g., microwave french fries, hash browns, wedges).

In their incorporation aspect of use, the compositions of the present invention find particular use in bread and or breading-based products intended to be cooked or heated in a microwave oven by the consumer, e.g., bread crumb coatings for meat or fish portions. Such a food composition, in addition to the present edible susceptor components, additionally includes about 25% to 75% of a farinaceous material (e.g., bread crumbs, flour, cracker crumbs and mixtures thereof).

The heat generated from the microwave energy causes the surface coating to chemically react and produce a rapid, high temperature effect. In turn, in certain end-use applications, the heating can crispen and/or brown the surface of the food substrate to which the present susceptor compositions have been applied. This browning reaction creates the appearance of the food product having been baked in a standard convection oven.

Another manner of use is where browning and/or crispening is not necessary, but very rapid heating is desired. For example, the present susceptor compositions can be added to a conventional ice cream or frozen novelty coating. Upon microwave heating, the fortified coating heats much more quickly than an unfortified coating and allows the ice cream substrate to remain colder and more firm.

The present susceptor compositions are prepared as viscous dispersions or emulsions and can be applied directly to the surface of a food as a paste. The dispersion can be diluted with greater or lesser amounts of the edible oil for easier handling in spraying, rolling, and brushing applications. Alternatively, the composition can be in a particulate form and applied to the surface of a food substrate as a coating. The present edible microwave susceptor composition can be cast into a film or sheet form by incorporation, for example, into a pastry sheet. In still another embodiment, the present compositions can be encapsulated such as by using an edible gum or other coactivate or encapsulant. Preferably, the ratio of encapsulate/susceptor composition to encapsulant is at least 1:1, preferably at least 1.5:1. The encapsulated composition is preferably in the form of particles having a diameter of less than 2 mm, preferably less than 1 mm.

The formulations of the intended food substrate products to which the present edible susceptor compositions are intended to be applied to are those conventionally used in the industry.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention can be undertaken without departing from the spirit and scope of the invention.

EXAMPLE 1

To demonstrate and compare the relative performance of the present edible microwave susceptor compositions, a series of microwave heating profiles of temperature versus time were generated. The results of this testing are depicted in FIG. 1.

An edible susceptor composition of the present invention was prepared having the following formulation:

| Ingredient | Weight % |
| --- | --- |
| Soybean oil | 96.5 |
| Lecithin[1] | 1.0 |
| Glycerin | 2.0 |
| Sodium potassium tartrate | 0.5 |
| | 100.0% |

1. A heat resistant lecithin available from the Central Soya; Inc. Chemurgy division under the trade name Centraphase® HR.

In a first test, a 50 g benchtop batch of the edible susceptor composition was prepared by blending the ingredients in a blender with thorough mixing in the following order: oil, lecithin, sodium potassium tartrate, glycerine. A 30 g sample was poured into a paper tray and three luxtron temperature probes were inserted into the solution in the tray and the data averaged. Temperature measurements were taken at five second intervals. A 75 g water load was also placed in the 620 watt microwave. The results of such testing are given in FIG. 4 as temperature curve 18.

For a base line comparison, 30 g of corn oil in a paper tray was heated in a second test in the same 620 watt microwave oven, also with a 75 g water load. The results of this test are depicted in FIG. 1 as the curve designated by reference numeral 12.

A third sample evaluated was a margarine (Blue Bonnett brand) having an approximate composition as follows:

| | | |
| --- | --- | --- |
| — | Oil (corn oil) | 80% |
| | Moisture | 18% |
| | NaCl | 2% |

The margarine was similarly heated with a water load. The results of such testing are also depicted in FIG. 1 as a temperature curve 14. It can be seen that margarine reaches a plateau temperature of about 225° F. or about the boiling temperature of the margarine.

In a fourth test, a 30 g sample of corn oil, also with a 75 g water load is heated but using a conventional aluminum metallized susceptor by forming a paper tray cut from a microwave popcorn bag. The results of such testing are depicted by heating curve 16. Curve 16 shows that with the assistance of the metallized susceptor, a temperature of 300° F. is achieved within one minute.

Curve 18 shows that the present edible susceptor composition achieves a temperature of >300° F. within a minute and thus generally comparable to the results obtained with a and thus generally comparable to the results obtained with a conventional metallized film microwave susceptor. The results of such testing show both the suitability of the present compositions for use as edible microwave susceptors. The tests also show the importance of avoiding added water in those applications intended for browning and crispening (see curve 14 where the susceptor reaches only the boiling point of margarine and plateaus at such temperature).

EXAMPLE 2

An edible microwave susceptor of the present invention was prepared having the following formulation:

| Ingredients | Weight % |
| --- | --- |
| Corn oil, liquid | 33.3 |
| Polyglycerol esters of oleic acid[1] | 16.7 |
| Trisodium phosphate | 16.7 |
| Glycerin | 16.7 |
| Cellulose, fine powder[2] | 16.6 |
| | 100.0% |

1. An emulsifier blend available from Karlshamns USA under the trade name Caprol 3GO.
2. Available from the Reed Corp. as powdered cellulose Grade L600/20 (FCC).

A 50 g benchtop batch of the edible susceptor composition was prepared by blending the ingredients with a mixer thoroughly mixing in the following order: oil, polyglycerol esters of oleic acid, trisodium phosphate, glycerin, cellulose. The edible susceptor composition so prepared is in the form of a thick paste.

About 1 g of the susceptor composition was painted onto the upper major surface of a disk of refrigerated biscuit dough.

The coated biscuit and an uncoated control biscuit were then microwave heated together in a microwave oven (620 watt) for 1½ minutes, without any other microwave susceptor.

After microwave heating the plain or control biscuit showed very little top surface browning. In contrast, the edible susceptor coated food substrate of the present invention had a rich, even brown surface. The results of this testing show that the edible susceptor composition rapidly achieves browning temperatures upon microwave heating.

An edible susceptor composition of the present invention of similar heating and browning properties is prepared when in the above formulation the trisodium phosphate is replaced with an equivalent amount of sodium potassium tartrate.

EXAMPLE 3

An edible microwave susceptor composition of the present invention was prepared having the following formulation:

| Ingredients | Weight % |
| --- | --- |
| Coconut oil, solid | 15 |
| Hard mono & diglycerides[1] | 10 |
| Polyglycerol esters of oleic acid[2] | 20 |
| Trisodium phosphate | 20 |
| Sodium potassium tartrate | 10 |
| Propylene glycol | 25 |
| | 100% |

1. A hardstock material used herein as an oil thickener available from Witco Corp. under the trade name Atmul 84K powder.
2. A PGE available from Karlshamns USA Inc. under the trade name Caprol 3GO.

The edible susceptor composition is prepared in a manner generally comparable to that described in Example 2. However, first the oil component is heated to above 140° F. Next, the mono and diglycerides are added to the heated oil and mixed with continuous vigorous agitation to form a fluid fat. Next, the other components are added to the fluid fat with vigorous agitation, one at a time in the following order: polyglycerol ester, sodium potassium tartrate, trisodium phosphate, propylene glycol to form a thick, paste-like homogeneous blend.

The microwave heating performance of the edible microwave susceptor composition so formed was evaluated in the manner described in Example 2. A 1 g quantity of the composition was topically applied to the top of a refrigerated biscuit dough disk (about 23 g in weight). The coated disk and an uncoated control disk were then microwave heated for 1½ minutes in a 620 watt microwave oven.

The results of such testing showed that the uncoated biscuit was as is described in Example 2. The coated biscuit in contrast exhibited surface browning indicating having been heated to browning temperatures.

To investigate the performance of a food substrate coated with the edible susceptor after limited storage, equivalent samples were stored frozen (0° F.), refrigerated (40° F.), and at room temperature (72° F.) for 24 hours. After allowing to warm to room temperature so as to be comparable to the prior samples of Examples 2 and 3 above, the stored, coated biscuits were microwave heated for 1½ minutes. All samples after microwave heating exhibited surface browning roughly comparable to the unstored samples. The results of such testing suggest that food products coated with edible susceptors of the present invention can be distributed either by room temperature, refrigerated or frozen storage.

EXAMPLE 4

An edible microwave susceptor composition was prepared having the following formulation:

| Ingredients | Weight % |
| --- | --- |
| Soybean oil, solid[1] | 33.5 |
| Lecithin[2] | 33.5 |
| Glycerin | 16.5 |
| Sodium potassium tartrate | 16.5 |
| | 100.0% |

1. A partially hydrogenated soybean oil.
2. A lecithin available from Central Soya Chemurgy division under the trade name Centrophase® C.

The edible susceptor composition was prepared in a manner comparable as described in Examples 1 and 2. The solid soybean oil was heated until liquid and charged to a blender. Next, each ingredient was added, one at a time in the following order: lecithin, sodium potassium tartrate, glycerine. Blending was continued until thickened and cool. The edible susceptor composition so prepared was in the form of a thick paste.

The microwave heating performance of the susceptor composition was evaluated as in Examples 2 and 3, except that only one biscuit at a time was microwaved for 1½ min to get yellow/brown color. The finished heated biscuit exhibited substantial surface browning of the coated surface.

A substantially similar composition in terms of microwave absorption and heating performance is obtained when an hydroxylated lecithin is substituted for the lecithin in the above formulation.

EXAMPLE 5

An edible microwave susceptor composition of the present invention was prepared having the following formulation:

| Ingredients | Weight % |
| --- | --- |
| Soybean oil, liquid | 22.0 |
| Polyglycerol esters of oleic acid[1] | 44.0 |
| Trisodium phosphate | 22.0 |
| Glycerin | 4.4 |
| Hard mono & diglycerides[2] | 7.6 |
| | 100.0% |

1. An emulsifier blend available from Karlshamns USA under the trade name Caprol 3GO.
2. A hardstock material used herein as an oil thickener available from Witco Corp. under the trade name Atmul 84K powder.

The edible susceptor composition is prepared in a manner comparable to that described in Example 3.

A food product of the present invention was prepared comprising 5 g of the above prepared edible susceptor composition and 10 g of bread crumbs. The susceptor composition and bread crumbs were thoroughly mixed. A breaded fish portion of the present invention was prepared by applying to a battered fish portion the above crumb mixture. For comparison, a controlled fish portion was prepared substituting 5 g of soybean oil for the 5 g of edible susceptor composition.

The present breaded fish portion and the controlled fish portion were microwave heated together in a 620 watt microwave oven for four minutes.

A visual examination of the resultant microwave baked fish fillets indicates that the fish portion comprising the edible susceptor composition of the present invention exhibited substantially greater browning whereas the fish portion comprising the pure oil did not brown.

EXAMPLE 6

An edible microwave susceptor composition of the present invention was prepared having the following formulation:

| Ingredients | Weight % |
| --- | --- |
| Soybean oil, liquid | 27.2 |
| Hard mono & diglycerides[1] | 4.8 |
| Polyglycerol esters of oleic acid[2] | 27.2 |
| Trisodium phosphate | 16.3 |
| Sodium potassium tartrate | 10.9 |
| Glycerin | 13.6 |
|  | 100.0% |

1. A hardstock material used herein as an oil thickener available from Witco Corp. under the trade name Atmul 84K powder.
2. An emulsifier blend available from Karlshamns USA under the trade name Caprol 3GO.

The edible susceptor composition was prepared as described in Example 3.

A 2 g sample of the solution was applied to 92 g of raw potato wedges by painting the solution on the surface of the potatoes. The coated potato wedges were microwave heated for 5 minutes separately from the uncoated raw potato wedges. The coated food products exhibited a substantial area having a brown surface. In contrast, the uncoated potato pieces exhibited no surface browning.

EXAMPLE 7

An edible microwave susceptor composition of the present invention was prepared having the following formulation:

| Ingredients | Weight % |
| --- | --- |
| Soybean oil, liquid | 95.5 |
| Lecithin (heat resistant) | 1.0 |
| Silica dioxide | 1.0 |
| Sodium potassium tartrate | 0.5 |
| Glycerin | 2.0 |
|  | 100.0% |

The edible susceptor composition was prepared by blending one at a time in the order listed above together with vigorous agitation to form a thin slurry.

The edible susceptor composition was then used to prepare a microwave popcorn product. Seventy grams of popcorn was admixed with 30 g of the composition and without any common salt. The popcorn/susceptor blend was then added to a microwave popcorn bag that did not have an aluminum susceptor and heat sealed.

The microwave popcorn product with an edible microwave susceptor so formed was then heated in a 620 watt microwave oven until cessation of popping (about 3 min.). The popped popcorn so prepared was greater in volume and exhibited a lower percentage of unpopped kernels relative to a popcorn/fat charge without a metallized film microwave susceptor.

EXAMPLE 8

An edible susceptor composition of the present invention was prepared and applied to a conventional food pot pie to form a coated food product of the present invention. The edible susceptor composition had the following formulation:

| Ingredients | Weight % |
| --- | --- |
| Cottonseed oil | 25 |
| Polyglycerol esters of oleic acid[1] | 40 |
| Trisodium phosphate | 20 |
| Glycerine | 6 |
| Hard mono & diglycerides[2] | 9 |
|  | 100% |

1. An emulsifier blend available from Karlshamns USA under the trade name Caprol 3GO.
2. A hardstock material used herein as an oil thickener available from Witco Corp. under the trade name Atmul 84K powder.

The edible susceptor composition was prepared by heating the ingredients and admixing as described in the previous examples.

About 6 g of the present edible susceptor composition so prepared was applied to the bottom and sides of a pot pie weighing 196 g. An additional 3.5 g of the composition were applied to the top crust.

The coated food substrate so prepared was placed in a paper tray and microwave heated for 5 minutes.

The resultant microwave heated product was a nicely browned top crust and sides and had the appearance of an oven baked pot pie.

EXAMPLE 9

A coated food product of the present invention having an edible susceptor applied to an interior major surface was prepared using an edible susceptor composition of the present invention. The edible susceptor had the following formulation:

| Ingredients | Weight % |
| --- | --- |
| Cottonseed oil | 40 |
| Polyglycerol esters of oleic acid[1] | 30 |
| Trisodium phosphate | 15 |
| Glycerine | 5 |
| Hard mono & diglycerides[2] | 10 |
|  | 100% |

1. An emulsifier blend available from Karlshamns USA under the trade name Caprol 3GO.
2. A hardstock material used herein as an oil thickener available from Witco Corp. under the trade name Atmul 84K powder.

The composition was prepared by heating and admixing the ingredients as described in the above examples.

Two layers of ready to bake refrigerated biscuit dough were prepared having 0.6 g of the solution applied on each layer. The food product of the present invention so prepared was then microwave heated in a 680 watt oven for two minutes. After such microwave heating, the interior coated surfaces exhibited browning on both the upper and lower interior surfaces and the top outer surface of dough was also browned.

EXAMPLE 10

An edible susceptor composition of the present invention was prepared having the following formulation:

| Ingredients | Weight % |
|---|---|
| Soybean oil, liquid | 50.0 |
| Trisodium phosphate | 6.0 |
| Glycerin | 22.0 |
| Polyglycerol esters of oleic acid | 22.0 |
| | 100.0% |

The susceptor composition was prepared by admixing the ingredients as described in the above examples. However, the edible susceptor composition was then encapsulated to form particles having an average diameter of about 1–2 mm and comprising about 50% by weight encapsulant and encapsulate (edible gum).

About 1 g of the capsules were placed on the top of a refrigerated biscuit dough piece weighing about 23 g. Both the coated and a second biscuit that was uncoated as control were heated together for 1½ minutes in a 620 watt microwave oven to form finished baked goods.

The untreated biscuit was white and showed no indication of surface browning. In contrast, the treated biscuit showed surface browning under the microcapsules.

What is claimed is:

1. A process for providing a surface heated warmed foodstuff upon microwave heating to crispen or brown such warmed surface, comprising the steps of:
   A. providing a prepared food substrate having at least one surface capable of crispening or browning;
   B. providing an edible microwave susceptor composition mixture comprising by weight:
      1. 8% to 97% of the composition of an edible fat;
      2. 2% to 90% of the composition of a primary microwave absorbing polyhydric alcohol selected from the group consisting of glycerine, propylene glycol, polyethylene glycol and mixtures thereof;
      3. 1% to 90% of a microwave absorbing emulsifier selected from the group consisting of lecithin, polyglycerol esters of oleic acid, sorbitan monoesters, acetylated monoglycerides, sodium stearoyl-2-actylate, and mixtures thereof; and
      4. 0.10% to 30% of the composition of a supplemental microwave absorbing inorganic material selected from the group consisting of sodium potassium tartrate, trisodium phosphate, aluminum potassium sulfate, sodium hexameta- phosphate, sodium aluminum phosphate, titanium dioxide, silicon dioxide, magnesium oxide, elemental iron and mixtures thereof;
   C. coating the mixture of (B) onto the surface of the foodstuff to form a coated foodstuff; and
   D. exposing the coated foodstuff to microwave radiation for a period of time between 0.5 to 4 minutes to form a microwaved foodstuff.

2. The process of claim 1
   wherein the supplemental microwave absorbing inorganic material is selected from the group consisting of sodium potassium tartrate, trisodium phosphate, aluminum potassium sulfate, sodium hexametaphosphate, sodium aluminum phosphate and mixtures thereof.

3. The process of claim 2, comprising
   A. about 30% to 70% of the edible fat,
   B. about 10% to 30% of the polyhydric alcohol,
   C. about 10% to 30% of the emulsifier, and
   D. about 5% to 15% of the inorganic member.

4. The process of claim 3
   wherein the composition additionally comprises:
   E. about 2% to 25% of a thickening agent.

5. The process of claim 4
   wherein the edible susceptor composition has a moisture content of less than 1%.

6. The process of claim 5
   wherein the composition additionally comprises:
   E. about 5% to 10% by weight of a thickening agent.

7. The process of claim 6
   wherein the inorganic member is selected from the group consisting of trisodium phosphate, sodium potassium tartrate and mixtures thereof.

8. The process of claim 7
   wherein the emulsifier is a polyglycerol ester of oleic acid.

9. The process of claim 8
   wherein the thickening agent is selected from the group consisting of a mono and diglyceride hardstock, cellulose, starch, silicon dioxide, and mixtures thereof.

10. The process of claim 9
    wherein the inorganic member is trisodium phosphate.

* * * * *